United States Patent [19]
Amberg et al.

[11] 3,760,968
[45] Sept. 25, 1973

[54] COMPOSITE CONTAINER ARTICLE

[75] Inventors: Stephen W. Amberg, St. James, N.Y.; Clarence A. Heyne; Stewart M. Lang; John H. Meincer, all of Toledo, Ohio

[73] Assignee: Owens-Illinois, Inc., Toledo, Ohio

[22] Filed: July 2, 1971

[21] Appl. No.: 159,443

Related U.S. Application Data

[63] Continuation-in-part of Ser. No. 92,437, Nov. 24, 1970, abandoned.

[52] U.S. Cl. .............................................. 215/12 R
[51] Int. Cl. .................................................. B65d 23/08
[58] Field of Search .................... 215/1 C, 12 R, 13, 215/DIG. 6, 38 A; 150/52 R; 156/78, 79, 85, 86; 40/306, 310

[56] References Cited
UNITED STATES PATENTS

| | | | |
|---|---|---|---|
| 3,604,584 | 9/1971 | Shank | 215/12 R |
| 3,110,554 | 11/1963 | Yazumi | 156/85 |
| 3,400,810 | 9/1968 | Makowski | 206/65 S |
| 3,480,168 | 11/1969 | Lee | 215/12 R X |
| 3,542,229 | 11/1970 | Beyerlein | 156/86 X |

Primary Examiner—Donald F. Norton
Attorney—J. R. Nelson et al.

[57] ABSTRACT

The invention disclosed relates to an improved container article for pressurized products, such as beer, beverages, and the like, which is made from a glass bottle or jar and a sheet of shrinkable plastic material pre-decorated as flat sheet, then wrapped on a mandrel to a sleeve that is telescopically inserted over the major side wall of the bottle so that a lower marginal end thereof overhangs the bottom end of the bottle. The sleeve may be of a pre-foamed or non-foamed plastic material and is shrunken in situ by heat so that it fits snugly on the bottle surface and conforms to the body around its shoulder, side wall and its lower corner radius or heel and onto the bottom end of the bottle protecting the glass against surface damage, providing a pre-printed label or decoration for the bottle and covering the bearing surface and lower corner radius of the bottle protecting those areas plus affording coaster protection to furniture or like surfaces. The orientation of the plastic is major on the peripheral dimension of the sleeve and minor on the axial dimension. Antistatic compounds are applied to the surface opposite the printed surface also priming the bottle for good cohesion of the sleeve. The plastic sleeve has a skin depth differfential, the thicker skin being adjacent the bottle.

25 Claims, 15 Drawing Figures

COMPOSITE CONTAINER ARTICLE

This application is a continuation-in-part of an earlier copending U.S. Pat. application Ser. No. 92,437, filed Nov. 24, 1970, now abandoned.

DESCRIPTION

The invention relates to an improved container in which is utilized a selection of materials — glass and plastic — to provide exceptional functional advantages of strength, preservation of the glass, aesthetic appearance, manufacturing convenience and ease in labelling or decorating, and a bearing ring surface on the bottom end of the bottle that will minimize or eliminate marring of surfaces whereon bottles are placed.

BACKGROUND OF THE INVENTION

In the present art of glass containers, several expedients have been employed to preserve the pristine strength of the outer glass surface of the bottle. Among these are various transparent spray coatings of metal oxides, such as titanium, tin or like compounds, which pyrolize and form a thin invisible coating to prevent surface abuse of the glass. Other transparent organic coatings have been provided to similarly avoid surface scratches or abrasions of the bottle exterior in handling after the bottle is manufactured. These coatings in part attempt to impart a lubricity to the glass — make them less tacky or abrasive — so that upon contact with other containers or objects less abrasion may result. However, in the various coatings applied to the newly formed bottles there are certain attendant problems. Among these are difficulty in labelling, such as with adhesively applied paper or foil labels, and difficulty in determining whether an adequate coating has been applied.

A recent innovation for overcoming the foregoing problems in the container industry is disclosed in U.S. Pat. No. 3,482,724 in which a composite container provides a base element secured to the glass to provide a coating for the lower portions of the glass, eliminating glass-to-glass contact at the major diameter, provide a pre-labelled base fitment on the container, and, characteristic of that container, the base provides stable "no-mar" bearing support for the package.

A more recent innovation directed to overcoming the foregoing problems is set forth in U. S. Pat. application of Carlton A. Richie, Ser. No. 129,691, filed Mar. 31, 1971 and owned by the assignee of this application.

SUMMARY OF THE INVENTION

In the present invention, a bottle providing the product storage compartment or envelope has applied thereto a unique sheath or sleeve covering that may be predecorated or labelled by high speed, high quality "flat" printing, is inexpensive to make and apply and provides body protection for the container against abrasion or surface damage and a bottom bearing ring support.

The invention includes the preferred form of sleeve that in its finished form is tightly engaging onto the bottle constructed of glass susceptible to surface damage and abrasion in lessening its strength.

In another form of the invention, the sleeve composed of a pre-foamed, shrinkable material is applied to provide a light weight, cellular but relatively thick cushion of protection to the glass, thereby adding further protection.

Another important feature of the invention is the provision of a plastic sleeve, preferably of foamed, shrinkable thermoplastic material, formed from a rectilinear blank of sheet material and wrapped onto a cylindrical mandrel such that the opposite ends of the blank overlap for forming a lapped seam. Heat and pressure is applied in the overlap areas to heat seal the seam and compress the material, thereby reducing the thickness of the overlapping layers to be substantially that of the single thickness layer of the remainder of the sleeve. This offers a strong connection for the ends of the blank in forming the sleeve, yet is an attractive and functional covering upon shrinking the sleeve to conform to the bottle.

The present invention, in the various embodiments herein presented, provides for variation in body wall coverage that ranges in the minimum sleeve that extends from the major diameter in the body of the bottle into the bottom end in an annular bearing surface to the maximum sleeve that extends from adjacent the mouth finish region into the bottom end. Thus in the bottle design, the best overall container from the standpoint of appearance, decoration and function — with safety and strength a major consideration — is selected to provide the new and improved container of the invention suitable for the product to be packaged. The preferred body coverage of the sleeve on the bottle include coverage of the shoulder region whereat the major diameter body tapers upwardly and inwardly toward the neck finish of the bottle.

The present invention provides a suitable sleeve wherein the thermoplastic when formed to a sheet is oriented as follows: In the machine direction, the sheet has major orientation (M); and, along the cross direction, the sheet has minor orientation (T). The ratio of M/T is substantially greater than 1; preferably on the order of $M/T = 2$ or more.

Another important feature of the invention is the depth of skin formed on the thermoplastic sheet for the sleeves. The skin depth ratio between opposed surfaces should be 1.2 times greater at the sleeve surface adjacent the bottle than the skin depth of the opposite outer surface.

The sleeve passes a further significant feature in that in preparation for preprinting an antistatic compound is applied to the surface of the sheet opposite the printed surface (the latter normally being the outside surface of the sleeve). The antistatic solution further enhances cohesion of the plastic material on the glass surface after the plastic sleeve is shrunken snugly onto the bottle.

Several other attendant objects and advantages of the invention will become apparent to those skilled in the art from the descriptions and drawings of the invention, as will presently appear.

BRIEF DESCRIPTION OF THE DRAWINGS

FIGS. 5–11, respectively, illustrate the fabrication of the container of the present invention, to wit:

With reference to FIGS. 1–4, the container of this invention will be described.

Figure 1:
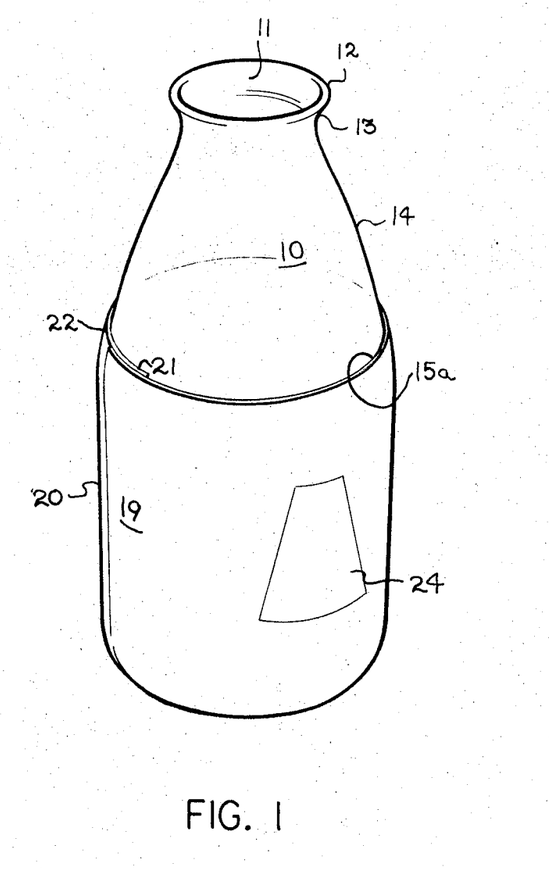
FIG. 1 is a front perspective view of the container of the preferred form of the present invention in a vertical position.
Figure 2:
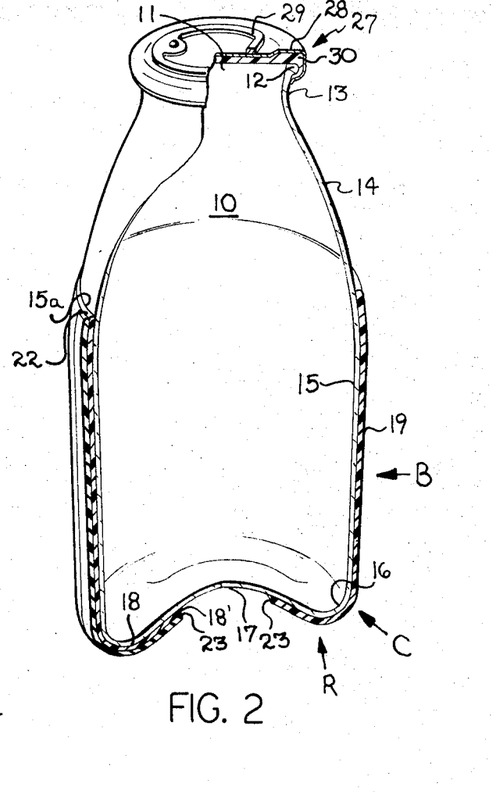
FIG. 2 is a sectional elevational view taken along line 2—2 on FIG. 4.

A glass bottle 10 has a mouth opening 11 defined by a finish rim 12 at the inwardly tapered neck 13. The neck 13 blends with the outwardly tapering shoulder 14 that is contiguous with the cylindrical body portion 15. Body 15 represents the major or maximum diameter (major circumference 15a) of this form of the bottle 10. The lower reach of body 15 describes a corner radius 16 or heel joining the bottom end 17 of bottle 10. Preferably, corner radius 16 is relatively large to provide a curvature adjacent the bottom end of the bottle. The usual design of bottle 10 provides that end 17 is a slightly concave surface such that an annulus portion (bearing ring) of end 17 supports bottle 10 on a flat horizontal surface. This annular bearing ring region is shown on FIG. 3 as the stippled area 18.

Figure 3:
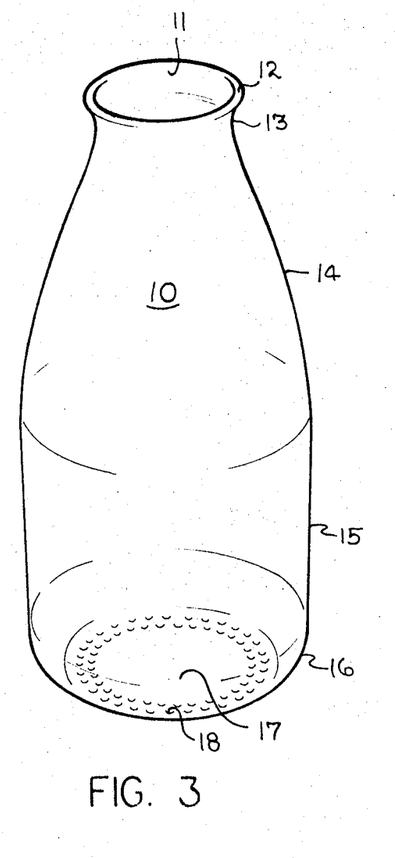
FIG. 3 is a front perspective view of a glass bottle portion of the container of FIG. 1.

A sleeve 19 of a plastic material is assembled to the bottle 10 in a manner to be presently described. The sleeve 19 is formed from a rectangular sheet of heat shrinkable plastic material having opposed marginal ends 20 and 21 that are overlapped and seamed. In the illustrated embodiment of the invention, the dimension of ends 20, 21 is selected such that it is slightly greater than the distance from above the body portion 15, around bottom corner 16 to a point at about the inner edge of the recessed bottom area 18 (see 18 on FIG. 2). The sleeve 19 is formed as substantially a cylinder with a lapped seam joint, i.e., edges 20, 21 overlap each other, and these ends are heat sealed together in a manner to be described. The sleeve is telescopically moved over bottom end 17 of bottle 10 until the upper marginal edge 22 extends above the upper extremity of body 15 of the bottle (FIG. 3). In this relationship of assembly, the bottle 10 and sleeve 19 are placed in a heated atmosphere of sufficient temperature to shrink the plastic material and there retained to shrink sleeve 19 from its cylinder shape to a tight bottle conforming shape extending from the lower marginal edge 23 (FIG. 2) to the upper marginal edge 22.

Figure 5:
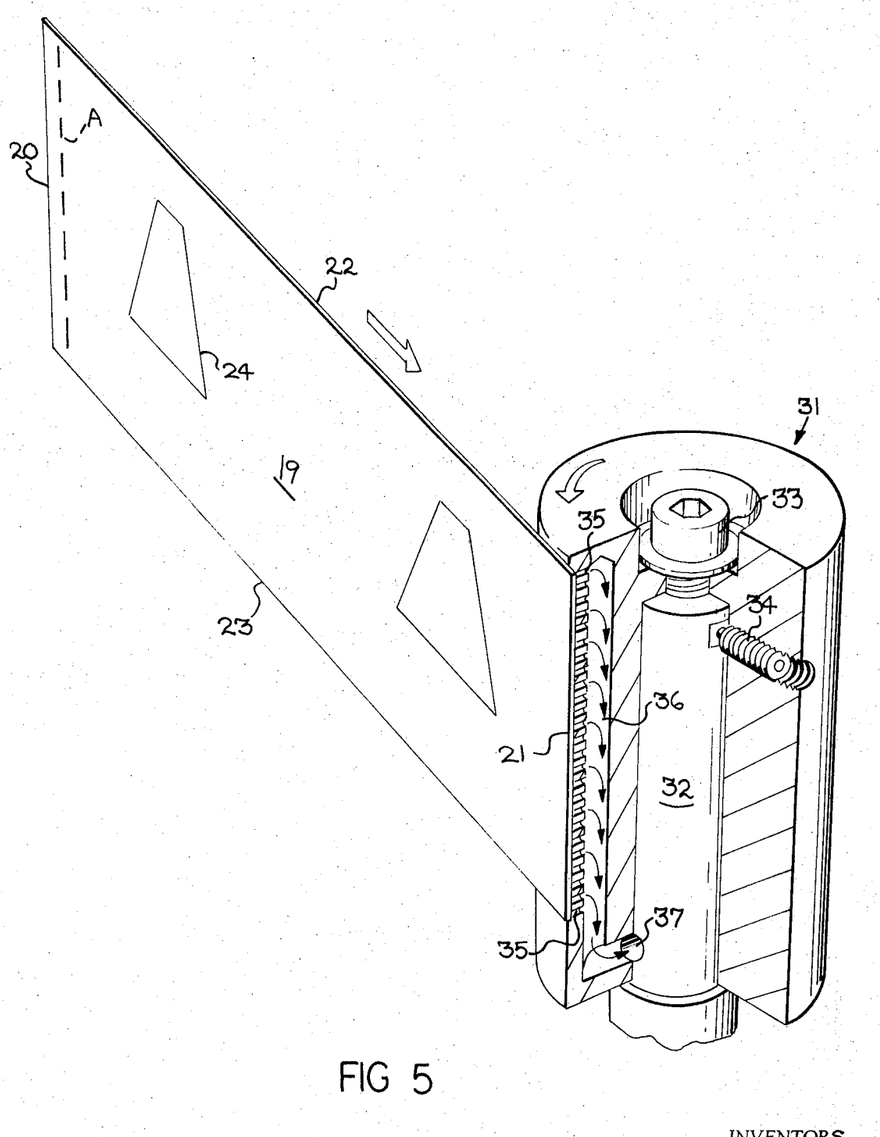
FIG. 5 is a schematic view of the mandrel for forming a pre-printed flat sheet of material into endless sleeve form.

The sleeve 19 is formed as a blank cut from flat sheet stock of shrinkable plastic sheet material, as in the form shown on FIG. 5, and has a decorative image 24 of preselected design printed on one face of the sheet blank between the ends 20, 21. Printing may be applied by any suitable method, color or design adaptable to the sheet material and such printing of design image 24 may be done while the sheet of material is a supply web, i.e., before the sleeve blank 19 is formed to size or the formed blanks 19 may be made in a sequence and then printed. Alternatively, no printing or image need appear on the blanks 19, however, one of the decided two-fold advantages of the sleeve 19 in the assembly of composite container of this invention is the provision of decoration for the container that is printed separately of handling the container and thereby achieve a cheaper, yet more desirable and higher caliber decoration plus the cost of extra handling of the bottle in applying a decoration is avoided.

Although it is not shown in the drawings, it is further possible under the invention to provide a pre-decorated bottle with a dense, opaque decorative image on its surface, such as at body surface 15, and apply to it a heat shrinkable sleeve of transparent or somewhat translucent material of the type contemplated so that the image of the decoration may be viewed through the sleeve 19. In this matter the sleeve serves as a protective covering for the decoration on the bottle body 15, as well as protection for the bottle 10 itself against exterior abuse and abrasion of the glass wall.

Figures 14, 15:
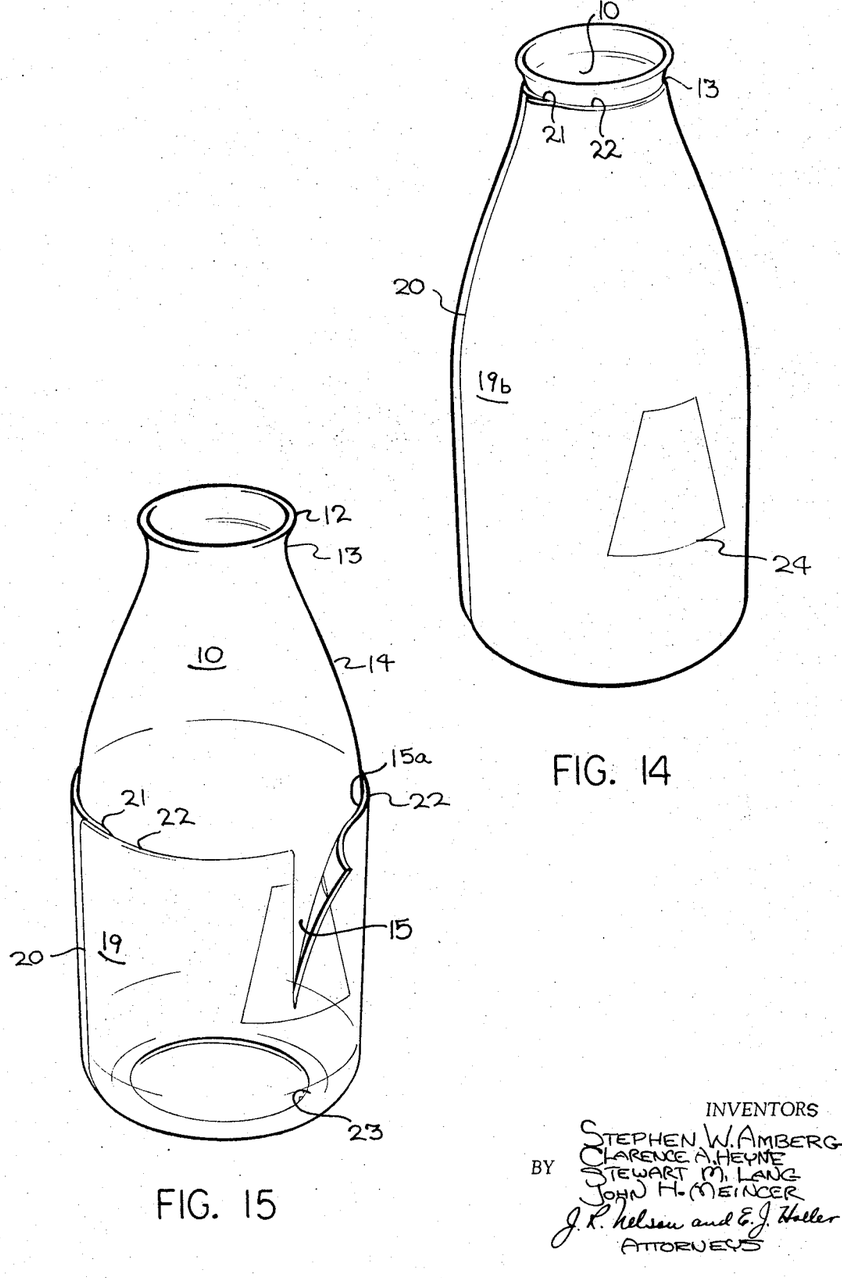
FIG. 14 is a front perspective view of a further embodiment of the invention showing a full height sleeve on a glass bottle.
FIG. 15 is a front perspective view of a container similar to FIG. 1 wherein the sleeve is partially rolled back from the bottle illustrating the application of a decorated image on the interior surface of a transparent sleeve.

Referring to FIG. 15, another form of the invention is illustrated in connection with decoration aspects. By utilizing a sheet of transparent or translucent shrinkable plastic material in the sleeve blank 19, a mirror image of the desired decoration 24' may be printed on the reverse or inside of the sleeve blank 19, i.e., the surface 25 that will be adjacent the bottle on FIG. 15. In this form, the image 24' may be also viewed through the sleeve and the latter serve to protect the decoration.

In the last two described alternate forms of the invention, the container may more readily serve as a "returnable bottle" for service through several trips in packaging beer or beverage products. The protection afforded the decoration and the bottle by the sleeve 19 (FIG. 15), will enhance the life of the bottle through handling, filling, capping, processing, shipping to market and handling of the consumer, and return to the bottler and his recycle usage involving washing and the rinse steps in the several repeat trips for delivery of product to consumers.

Figure 4:
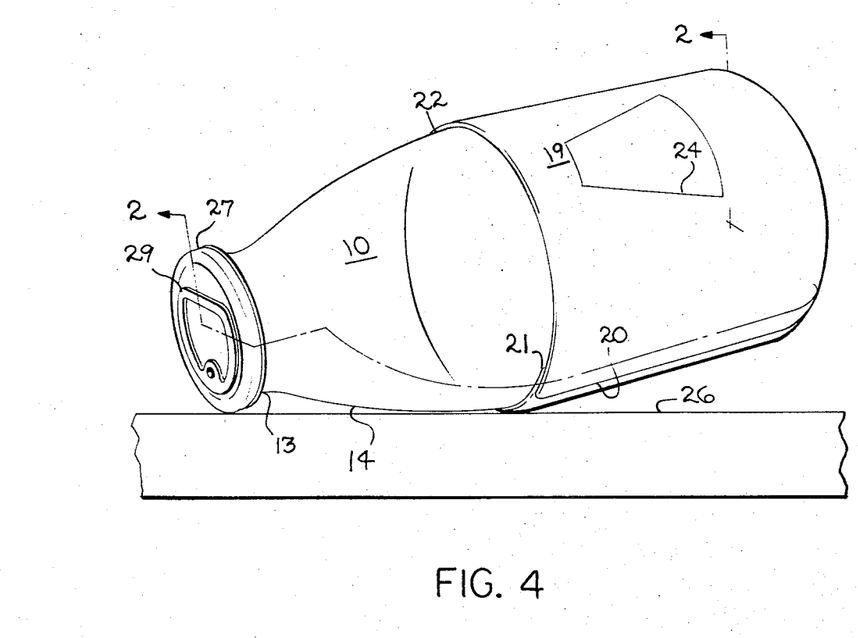
FIG. 4 is a front perspective view of the container of FIG. 1 shown tipped in a horizontal position on a horizontal support surface.

Referring to FIG. 4, another important design criteria in the present invention is the selection of the height of the sleeve 19 on the bottle 10.

By extending the sleeve on the bottle to just above the top of the body 15 of the bottle or above the uppermost major diameter of bottle 10, and onto the neck portion, when the bottle tips or falls, as shown on FIG. 4, at no point on the bottle does the glass wall come into contact with the horizontal surface 26, i.e., the floor, the table top, or the like. The neck and finish is covered by a closure 27 which absorbs the shock of impact thereat with surface 26.

The closure 27 shown on FIGS. 4 and 2, respectively, comprises an outer metal cap 28 of aluminum that may include a ring pull convenience opening device 29 attached to a prescored tear strip in the top panel of the cap and extending into the side or skirt. Underlying cap 28 is a sealant or gasket member 30 of an elastomeric material, such as polyethylene. The gasket 30 annularly surrounds the finish 12 of bottle 10 and in the preferred form shown extends across mouth opening 11 of the bottle. The particular finish 12 is not a part of this invention and, therefore, any known bottle finish may take the place of the finish 12 shown on the drawings. In the closure illustrated, the outer cap is crimped tightly onto bottle finish 12 and seals the closure against the finish and along the sloping neck 13 of the container. The gasket 30 of the closure is thus designed in the embodiment described to provide a seal of the closure on the container finish and provide a cushion for the glass finish against shock, such as that demonstrated by the tipped attitude of the container on FIG. 4.

In relation to the above-described embodiments of the invention, the following are some examples of materials that are preferred for use in the composite container.

The bottle 10 is comprised of a soda-lime-silica glass composition well known in the bottle industry and formed by conventional molding practices.

The plastic is made to provide major and minor degrees of orientation of the sheet. When the sheet is first extruded and formed it is stretched a major amount in a direction longitudinally of the axis of extrusion (the machine direction). The plastic, as it is extruded and cooled is also given a minor amount of orientation (stretch) in the direction transverse to the machine direction. This minor orientation is in the cross direction. If the major orientation is represented by M and the minor orientation by T, the resulting plastic tube has the orientation ratio where M/T is 2 or greater. The extruded tube is thereafter slit and formed into sheets or webs. The web has the aforementioned orientation property and is pre-printed, if desired, for certain of the embodiments hereindescribed, and then slit longitudinally into specific widths that correspond to the height dimension 20, 21 of the blank (FIG. 4).

In the printing of the webs, they may be printed with multi-color decorations at high speed on flexographic presses. Prior to printing, it has been found a suitable performance is achieved by coating the plastic web on the side opposite the printing side with an antistatic compound. One example is an alcohol-water solution of lauryl trimethyl ammonium chloride. This compound is commercially made and sold as "Arquad 12" by Armour Chemical Division, Armour, Incorporated, Chicago, Illinois. The surface coated with this compound further enhances the grip the sleeve of plastic will have on the glass bottle once the sleeve is shrunken thereon.

It is important that the major orientation of the web and ultimate shrink reaction be along the length of the blank 22, 23. After slitting the web to the height dimension, it may be stored as rolls. The preprinted rolls are then fed to a cutter and the blanks 19 are formed or cut to the dimensions 22, 23. The blanks 19 are fed to a mandrel 31 as shown on FIG. 4.

EXAMPLE I

The blanks are formed from a sheet of foamed plastic material having the aforementioned orientation. Examples of plastics are: copolymers of carboxylic acid containing monomers with ethylene which is sold in one form under the trade name "Surlyin," medium or low density polyethylene, polypropylene, polystyrene, cellulose propionate and cellulose butyrate, to name a few of the available plastic materials. The preferred thickness of the sheet is in the range of 0.01 to 0.03 inches.

In practice, it has been found that blanks made from a sheet of foamed polystyrene, oriented as described, and of approximately 0.02 inch thickness and 15 lb. per cubic foot density is very suitable in covering glass beer and beverage bottles of the 10 to 12 fluid ounce capacity size. In this form, the surface of the foamed material having a skin depth approximately 1.2 times the skin at the opposite surface is preferably placed next to the mandrel 31 so that the deeper skin surface of the plastic blank is on the inside surface of the sleeve.

EXAMPLE II

The blanks are formed from a sheet of non-foamed plastic material having the aforementioned orientation and shrink property. Similar plastic materials given for Example I may be utilized. The preferred thickness of the sheet is in the range of 0.003 to 0.007 inches, the thickness being selected in the interest of function of the sleeve covering and economy of the resulting container. In practice, a clear sheet of polystyrene shrink film of approximately 0.005 inch thickness is utilized for covering glass beer and beverage bottles of the 10 to 12 fluid ounce capacity size.

Figure 6:
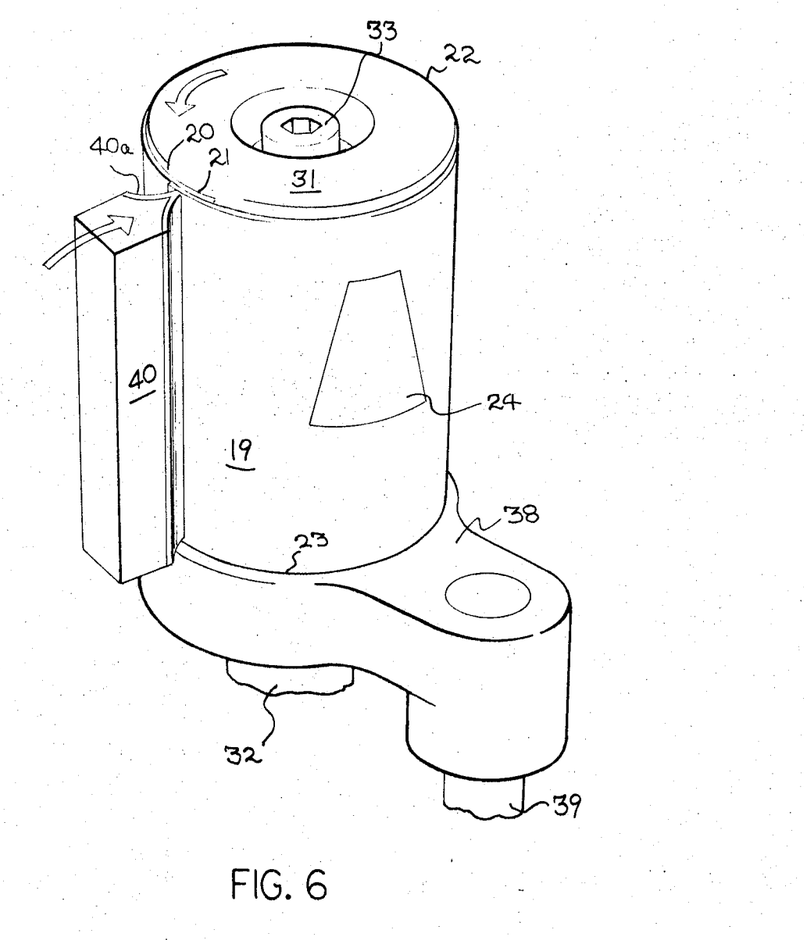
FIG. 6 is a schematic view of the apparatus of FIG. 5 showing the heat-sealing of a formed sleeve on the mandrel.

In FIGS. 5–11, fabrication of the container of the invention is disclosed. The sheet material, such as set forth by the above Examples, is cut to the shape of the blank for the sleeve 19, (in this case a rectilinear form), decorated with an image 24 — either before or after the blank cutting operation — and fed to a rotary mandrel head 31. Mandrel 31 is mounted on shaft 32 and held by collar 33 and set screw 34. Shaft 32 is rotated under power. The blank 19 is held to the mandrel by the vertical row of vacuum ports 35 connected to vertical passage 36 and through radial port 37 into the hollow center passage of shaft 32. The mandrel 31 is concentric with a stripper sleeve 38 carried on a bracket and vertical spindle 39 (FIG. 6). Blank 19 is attached at the leading edge 21 to mandrel 31 by vacuum, and as the mandrel rotates, blank 19 is wrapped or wound around the surface of the cylinder, which is the outer surface of the mandrel 31. The stripper sleeve 38 is in its lowered position out of interference with sleeve 19. The mandrel is the desired size (diameter) in relation to the bottle 10 that is to receive the sleeve when finished.

As the mandrel completes a revolution, the trailing edge of the blank overlaps the leading edge to form a lap-seam for the cylinder. The seam is made by heat and some pressure in bonding the overlapping regions of plastic together, accomplished by bringing heater 40 into contact with these overlapped areas of the sleeve 19. Heater 40 has a surface layer 40a of Teflon material to prevent sticking of the heater nose on the sleeve. Heater 40 is pressed against the overlapped plastic sheet and the combined heat and pressure of heater 40 irons the lap seam into substantially less than the double thickness of the overlap. This forms an endless or continuous sleeve that has a feathered edge in the overlapped seam somewhat compatible with the thickness of the remainder of sleeve 19. Heater 40 is on an appropriate carriage to be brought into and out of contact with the sleeve at the proper time and rotation of mandrel 31 during pressure contact of heater 40 as it irons the seam of sleeve 19. Any bump occurring around the bearing ring area, such as radially thereof along the seam of the sleeve, is ironed smooth or flat by pressure of the lower end of the covered bottle against a flat solid surface, such as pressing the bottle against a flat steel plate after the sleeve is shrunken onto the container surface.

As an alternative, the lap-seam may be made with a hot melt adhesive applied to the inner surface of the blank 19, such as in the area between edge 20 (FIG. 5) and phantom line A. Heater 40 will activate the adhesive area and form an adhesive bond between the overlapped ends of the material on mandrel 31.

Figures 7, 8:
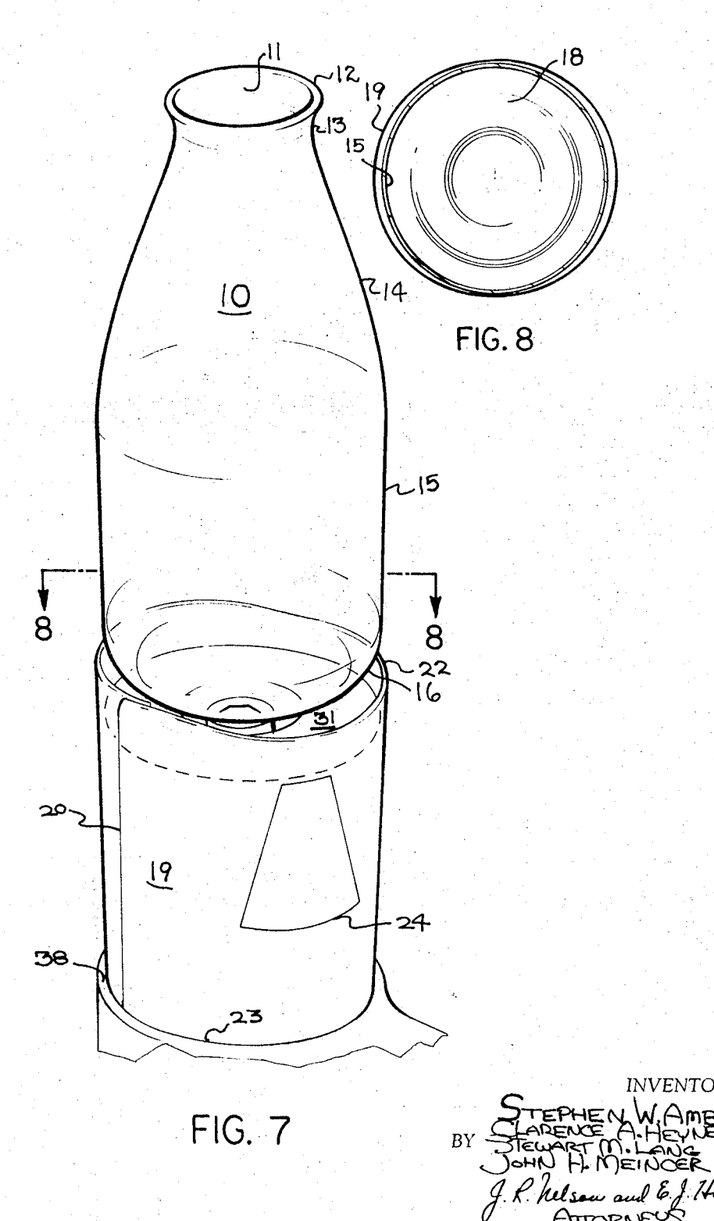
FIG. 7 is a schematic view of the sleeve being telescopically assembled with the bottle.
FIG. 8 is a sectional plan view taken along line 8—8 of FIG. 7.

As seen in FIG. 7, bottle 10 at elevated temperature (exceeding 175° F) is axially aligned over sleeve 19 on mandrel 31 and stripper sleeve 38 is raised to engage the lower edge of sleeve 19 and strip it upwardly off mandrel 31. As the sleeve 19 leaves mandrel 31, the lap-seamed construction, just described, causes the cylindrical sleeve to assume an elliptical shape. The sleeve was designed to be of just a slightly larger diameter than the larger or major bottle diameter and would be a loose fit relation on the bottle as the one is telescoped onto the other. However, due to the lap-seam treatment, the egg shape (eccentricity) of the sleeve 19 causes it to go over the bottle 10 with enough contact or snugness of fit in places to hold the sleeve on the bottle at the desired elevation. The sleeve makes this diametric side contact on bottle 10, as illustrated on FIG. 8.

Superior results in shrinking the sleeve on the bottle are obtained by using a hot bottle, i.e., a bottle preconditioned at a temperature in the range of 175°–300° F. Preferably, when utilizing the polystyrene materials of Examples I and II, the hot bottle is on the order of 220° F. The contour of the shrunken film may be more readily controlled by the hot bottle concept just described.

Considering the plastic material used and the thickness of the sleeve, the temperature of the hot bottle may be varied to meet the particular sleeve being applied. Similarly, the thickness of the film in the sleeve may be selected and controlled to meet a particular hot bottle temperature available in the manufacture of the container hereindescribed; yet obtain the proper degree of function of the sleeve covering on the bottle and stay within a reasonable cost for the particular package to which the container is to be utilized.

Figure 9:
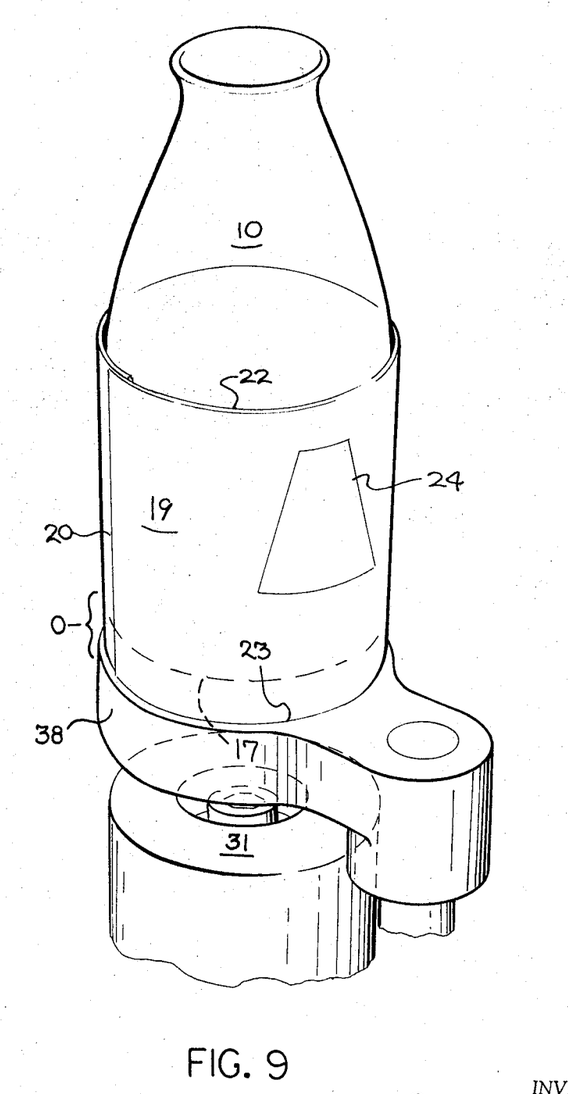
FIG. 9 is a perspective view of the bottle and sleeve in telescopically assembled position.
Figure 10:
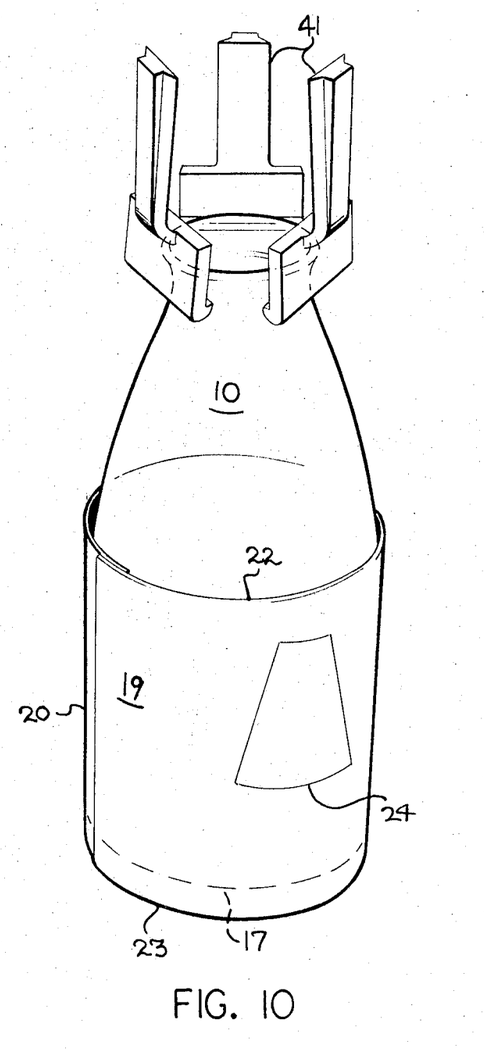
FIG. 10 is a perspective view of the bottle and sleeve being conveyed and rotated into heat treatment.
Figure 11:
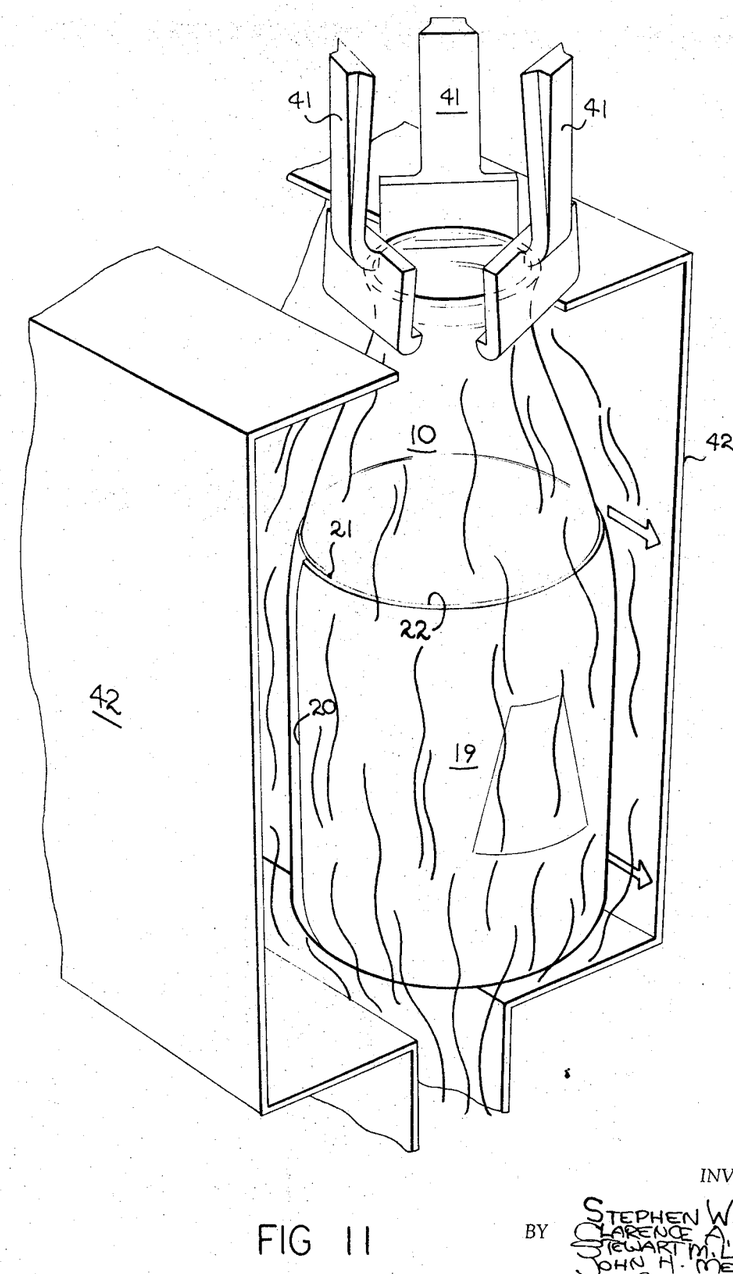
FIG. 11 is a perspective view of the bottle and sleeve of FIG. 10 undergoing heat treatment.

FIG. 9 shows the position of sleeve 19 as it is initially assembled on bottle 10 such that the lower edge of the sleeve is spaced below bottom end 17 an amount shown at 0. Normally, this spacing 0 is about one-half inch which is enough to form the bearing ring 18 on bottom 17 of the bottle.

From the position of FIG. 9, the stripper sleeve 38 is cleared and bottle 10 with sleeve 19 initially assembled is suspended from transfer tongs 41 which transport the assembly 10, 19 into and through an oven 42. Oven 42 is constructed as an elongated tunnel and heated air is circulated vertically of the tunnel as the containers are moved through this heat. The air temperature in the oven utilizing the polystyrene foamed plastic sleeve of Example I is preferably approximately 400° F and during a period from 4 to 15 seconds the sleeve 19 will shrink into snug fitting engagement with the adjacent surface of bottle 10 to form the finished container with bottom bearing ring, as shown on FIG. 1. If circulated hot air is used in a tunnel oven 42 the lower time of the time range will be accomplished. In assembling the sleeve on a heated bottle, by placing the assembly 10, 19 in an oven of 400° F still air, the shrink time will approach 6 to 15 seconds. The air temperature of oven 42 will of course vary with the speed of production desired and the plastic material of the sleeve that is being shrunken. As a further example of this, polyethylene film formed in accordance with Example II requires a heat treatment of 30 seconds in still air oven at 600° F. Most of the shrinkable thermoplastic materials may be shrunken in production of reasonable speeds at oven temperatures in the range of 175°–800° F. Using a hot or heated bottle enhances the production and obtains superior results, i.e., by varying the bottle temperature in the range of 175°–300° F depending upon the plastic material being run and the sleeve thickness.

Once sleeve 19 is shrunken snugly onto bottle 10, the container assembly is taken from the oven. Since the vertical overlapped seam area along the axial dimension of the sleeve is of different thickness and/or density from the adjacent single ply areas, a slight bump or lump will appear across the bearing ring 18 on the bottom 17. By pressing the bearing ring area downwardly against a flat rigid surface, such as a flat iron plate, this bump is ironed out in the bearing ring area and a flat, annular support area for the container is formed. The container of the present invention is now formed for subsequent use in filling it with product and applying the closure, such as is shown on FIG. 2.

The containers of the invention have been tested and compared with a standard of other glass containers. The following are results exemplary of the enhanced strength of the container of this invention compared to other containers. Ten ounce capacity containers of the FIG. 1 type were filled with a carbonated product and closed under pressure equal to 4-½ gas volumes. These were compared in strength with glass bottles untreated in accordance with this invention, however, the "bare glass bottles" were the same manufacture and design as the glass bottle portion 10 of the invention. Both the "bare glass bottles" and "sleeve covered bottles" were of 10 oz. capacity. By comparison, the "bare glass bottles" received a conventional metal oxide exterior coating; whereas, the "sleeve covered bottles" did not. Out of 24 bottle samples in a test, 12 of each type, the filled samples were dropped onto a ¾ inch steel plate from increasing heights until the container failed, i.e., the glass bottle broke. The data below is an average. In this test, the containers were dropped to strike at a given location indicated as "Type Drop."

Survival Height Average

| Type Drop | Bare Glass Bottles | Sleeve Covered Bottles |
|---|---|---|
| Bottom end | 43.0 inches | 52.8 inches |
| Side wall | 26.5 inches | 40.8 inches |

It was noted that in the tests, upon breakage of the bottle, the sleeve 19 of the bottles of this invention retained from 34 to 37 percent more of the glass in place than did the "bare glass bottles," thus demonstrating that upon breakage, the safety of the glass container is enhanced by the present invention.

Figure 12:
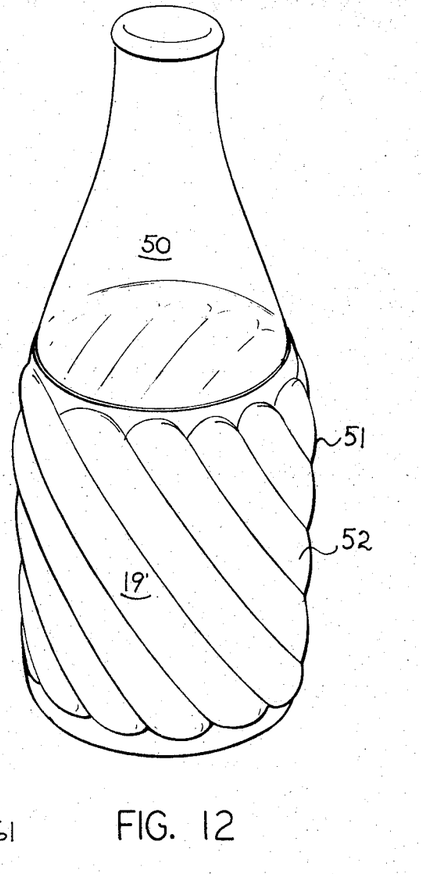
FIG. 12 is a front perspective view of a further form of the container of the invention illustrating irregular bottle surface configuration and applied sleeve.
Figure 13:
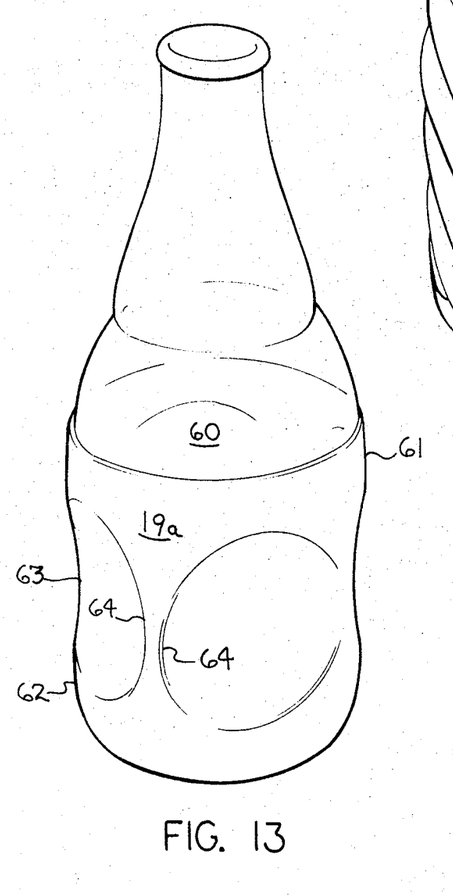
FIG. 13 is a front perspective view of a still further form of the container of the invention illustrating another glass bottle with irregular surface configuration.

Other forms of the invention are shown on FIGS. 12–14.

On FIG. 12, glass bottle 50 has a body portion 51 comprised of raised ribs or swirls 52. The sleeve blank 19' is a rectilinear form similar to the blank described earlier. The sleeve 19' is shrunken onto bottle 50 in the manner earlier described such that the sleeve has snug fitting engagement along the body wall 51 in the depressions or valleys on the bottle between the raised swirls. Throughout, sleeve 19' undergoes a relatively large extent of shrinkage such that the sleeve is reduced from its initial diameter, as formed on mandrel 31, to the varying diameters at the neck of bottle 50, the body thereof throughout the swirl 52 regions, at the heel curvature and onto the bottom end surface. This large extent of shrinkage reduces the sleeve into a snug conforming fit on the bottle, but without shrinkage in the height dimension 20, 21 of the blank. This is accomplished by the preferred orientation in the film from which the sleeve is made.

FIG. 13 illustrates another form of irregularly shaped bottle 60 which includes a body portion that has a shoulder region 61. Shoulder 61 is a major diametrical dimension of the bottle. Near the lower end of the bottle is a similar major diameter annular portion 62. Between shoulder portion 61 and lower raised portion 62 is a concave region 63 of lesser diameter. In essence, the body shape of the bottle just described is somewhat "hour-glass" shape. The sleeve 19a is again made to rectilinear form of a blank from a sheet of shrinkable or foamed shrinkable plastic material. The sleeve 19a is suitable for a bottle of hour-glass shape, as bottle 60, or a square shape or panel style bottle often used in certain product areas. In bottle 60, the areas shaded at 64 provide a pinched effect along the container wall and the sleeve 19a is shrunken into conforming, snug fitting relationship with the bottle side wall and end wall.

FIG. 14 illustrates a full height sleeve embodiment of the invention. The sleeve 19b is applied to the bottle 10 such that after it is shrunken, the sleeve extends from the neck region 13 around the heel of the bottle and onto the bottom end. The full height sleeve of this embodiment is shrunken into snug fitting engagement with the bottle wall by the treatment described earlier.

A modification of the FIG. 14 embodiment is the use of an adhesive coating on the interior surface of sleeve 19b. When the blank for sleeve 19b is formed, the inner facing side surface of the later formed sleeve is coated with a hot melt adhesive composition. This will enhance forming a firm lap-seam joint in making the sleeve (see FIG. 6). By taking the bottle from the manufacturing process with residual heat of forming such as in the Example I bottle at about 220° F, the hot melt adhesive at the lap-seam regions may be activated and sealed by some pressure, as by a pressure shoe, replacing the heater 40. After the sleeve is assembled over bottle 10 to the full height shown by FIG. 14, the combination of this residual heat of bottle 10 and the oven heat (400° F) in shrinking the sleeve will activate the adhesive inner coating and bond the shrunken sleeve tightly to the bottle. In this form, upon breakage of the glass bottle, 60–70 percent of the fragments of glass will be adhered to and retained within the sleeve. As such, the container will provide additional safety from loose glass fragments beyond the improvement provided in the FIG. 1 embodiment of the invention.

Although the invention is disclosed mainly with respect to a glass bottle assembly in making a composite container, some of the advantages of the invention may be realized in combining the plastic shrunken sleeve with containers or bottles of other materials.

Other and further modifications may be resorted to without departing from the spirit and scope of the appended claims.

What is claimed:

1. The combination of a glass container article having a wall surface defining a mouth opening at its one end, an opposite axial end providing a lower end for the container and a body portion between said opposite ends said lower end including an annular bearing surface for the container, the wall surface having a maximum width dimension in said body portion, and a foamed thermoplastic sheet material at least 0.010 inches thick and oriented substantially along one dimension of the sheet, said orientation being at least double any orientation along the other dimension thereof, said sheet being in a tubular, seamed form, the seam thereon comprising opposite marginal end portions of the sheet — along said other dimension overlapped and sealed together, the overlapped sealed portions being compressed — , said tubular form disposed in telescopic, circumferential relationship to the container body portion, and of an axial dimension to extend over the body portion and beyond the bearing surface of the container, said material being shrunken thereon into an annular covering in snug surface engagement with said glass wall by virtue of heat applied to the telescopic form, said shrunken covering layer providing a protective covering thereon.

2. The combination of claim 1, wherein said material is shrunken by heat applied to opposite surfaces of said telescopically disposed form thereof on said glass container.

3. The combination of claim 2, wherein the heat applied to one of said opposite surfaces in shrinking said form of said material is derived from the glass container while at a temperature in the range of 175°–300° F.

4. The combination of claim 1, wherein the thermoplastic is foamed polystyrene.

5. The combination of claim 1, wherein said thermoplastic sheet material is predecorated with an image and said seamed form is made therefrom.

6. The composite container of claim 5, wherein said foamed thermoplastic material is predecorated on the surface corresponding to the exterior of said tubular seamed form.

7. The combination of claim 5, wherein said seam is characterized by having the sealed overlapped opposite marginal ends of said sheet along said other dimension sealed together by an adhesive disposed between said lapped adjacent surfaces.

8. The combination of claim 5 wherein said seam is characterized by having the sealed, overlapped opposite marginal end portions of said sheet heat sealed together, and compressed.

9. The composite container of claim 1, wherein said layer of shrunken thermoplastic material comprises a foamed, polystyrene.

10. The composite container of claim 1, wherein said layer of shrunken thermoplastic material comprises a foamed, polyethylene material.

11. The composite container of claim 1, wherein said layer of shrunken thermoplastic material comprises a foamed, polypropylene material.

12. The composite container of claim 1, wherein said layer of shrunken thermoplastic material comprises a foamed, copolymer of carboxylic acid containing monomers with ethylene.

13. The composite container of claim 1, wherein said layer of shrunken thermoplastic material comprises a foamed, cellulose propionate material.

14. The composite container of claim 1, wherein said layer of shrunken thermoplastic material comprises a foamed, cellulose butyrate material.

15. The combination of a container article having a wall surface defining a mouth opening at its one end, an opposite axial end providing a lower end for the container and a body portion between said opposite ends, and a sleeve covering comprised of oriented plastic sheet material in tubular, seamed form disposed in a telescopic circumferential relationship to the container body portion, said sleeve being in snug surface engagement with said wall, and a decorative image on a surface of said sleeve providing a decoration for the container, the decoration being applied on said surface prior to formation of the sleeve and the opposite surface of the sheet material being coated with an anti-static compound prior to printing said decoration onto said sheet material.

16. The combination of claim 2, wherein the said one sheet surface of said plastic corresponds with the external surface of the sleeve formed therefrom and the said opposite surface corresponds with the internal surface of said sleeve.

17. A protective member for use with a container in making a composite container, comprising a rectilinear sheet of heat shrinkable foamed thermoplastic material, the opposite end margins being overlapped and heat sealed, thereby bonding the said marginal ends to form an endless, seamed sleeve, the overlapped margins being compressed to provide a feathered edge in the joined marginal ends, said sheet having an orientation of the plastic therein along one dimension that is at least two times orientation in the other dimension, said one dimension corresponding with the circumference of said seamed sleeve, and said sheet having a decorative image printed on the surface thereof corresponding to the exterior surface of said seamed sleeve.

18. The protective member of claim 14, wherein one face of said rectilinear sheet of said plastic material is precoated with an adhesive composition, the interior surface area of said sleeve is the adhesively coated face for bonding it to the container.

19. A protective member for use with a container in the making of a composite container comprising a rectilinear sheet of pre-foamed heat shrinkable thermoplastic material of at least 10 thousandths of an inch in thickness, the opposite end margins being overlapped and heat sealed with pressure thereat to form a compressed, feathered seam providing an endless, seamed sleeve that is elliptical in cross section, whereby said sleeve can be slipped over a container of a diameter that is slightly in excess of the minor diameter and slightly less than the major diameter of the ellipse and be retained thereon by friction, said thermoplastic sheet being highly oriented in the circumferential dimension of said sleeve such that the orientation along said dimension is at least two times any orientation of said sheet in the lengthwise dimension of said sleeve.

20. The protective member of claim 19 wherein the thermoplastic sheet is coated with an anti-static compound and then printed with a decorative image on the exterior surface of the sleeve.

21. A protective member for use with a container in making a composite container comprising a rectilinear sheet of heat shrinkable pre-foamed thermoplastic material of at least 10 thousandths of an inch in thickness, the sheet of said material being highly oriented in a direction along one side dimension thereof, and each of the opposite surface areas of said rectilinear sheet having a surface skin, the skin of the one surface area being of greater depth in said sheet than the skin of the opposite surface area, the opposite end margins of the one side dimension of said sheet being overlapped and securely joined to form an endless, seamed sleeve, the surface area possessing the greater skin depth in the thermoplastic sheet being disposed on the inside of said sleeve, whereby said thermoplastic sleeve is highly oriented circumferentially.

22. The protective member of claim 21, wherein the sheet of said thermoplastic material is oriented in the direction transverse to its said one side dimension, the orientation in the direction along said one side dimension being at least two times the orientation in the transverse direction.

23. The protective member of claim 21, wherein the greater skin depth on said inside surface area of the sleeve is at least 1.2 times the skin depth on the opposite surface area of said sleeve.

24. The protective member of claim 23 in which an image of decoration is printed on the outside surface of the sleeve and the inside surface area of said sleeve is coated with an antistatic composition.

25. The combination of a container article having a wall surface defining an opening at its one end, an opposite axial end providing a bottom for the container and a body portion between said opposite ends, said bottom including a bearing surface for the container, the wall surface having a maximum width dimension in said body portion, and a thermoplastic sheet material oriented substantially along one dimension of the sheet, said orientation being at least two times any orientation along the other dimension thereof transverse to said one dimension, said sheet being seamed in tubular form, the seam comprising overlapping opposed marginal end portions of said sheet along said other dimension thereof sealed together and compressed to a feathered seam said tubular form disposed in telescopic, circumferential relationship to the container is of an axial dimension to extend over the body portion and beyond the bearing surface of the container, whereby said oriented plastic material, shrunken by heat applied to the telescoped tubular form, provides an annular covering in snug surface engagement on said wall overlying at least a portion of the body and the bearing surface on the bottom of the container.

* * * * *

PO-1050
(5/69)

UNITED STATES PATENT OFFICE
CERTIFICATE OF CORRECTION

Patent No. 3,760,968  Dated September 25, 1973

Inventor(s) Stephen W. Amberg, Clarence A. Heyne, Stewart M. Lang and John H. Meincer It is certified that error appears in the above-identified patent and that said Letters Patent are hereby corrected as shown below:

Col. 2, line 29, after "bottle" insert --will--;

Col. 2, line 47, change "passes" to --possesses--;

Col. 10, lines 27 and 29 (Claim 1) delete the dash lines;

Col. 11, line 51 (Claim 18), change "14" to --17--.

Signed and sealed this 29th day of January 1974.

(SEAL)
Attest:

EDWARD M. FLETCHER, JR.
Attesting Officer

RENE D. TEGTMEYER
Acting Commissioner of Patents